(12) United States Patent
Kim et al.

(10) Patent No.: US 9,908,428 B2
(45) Date of Patent: Mar. 6, 2018

(54) METHOD AND CHARGING SYSTEM FOR SELECTING CHARGING MODE OF ELECTRIC VEHICLE

(71) Applicants: HYUNDAI MOTOR COMPANY, Seoul (KR); KIA MOTORS CORPORATION, Seoul (KR); YURA CORPORATION CO., LTD., Seongnam-si, Gyeonggi-do (KR)

(72) Inventors: Hyun Wook Kim, Seoul (KR); Myung Sun Jeong, Seoul (KR); Myoung Sik Kim, Seoul (KR); Won Gon Lee, Seongnam-si (KR)

(73) Assignees: Hyundai Motor Company, Seoul (KR); Kia Motors Corporation, Seoul (KR); Yura Corporation Co., Ltd., Seongnan-si (KR)

( * ) Notice: Subject to any disclaimer, the term of this patent is extended or adjusted under 35 U.S.C. 154(b) by 196 days.

(21) Appl. No.: 14/943,810

(22) Filed: Nov. 17, 2015

(65) Prior Publication Data
US 2016/0167538 A1 Jun. 16, 2016

(30) Foreign Application Priority Data
Dec. 16, 2014 (KR) .................. 10-2014-0180957

(51) Int. Cl.
*B60L 11/18* (2006.01)
*H02J 7/00* (2006.01)

(52) U.S. Cl.
CPC ........... *B60L 11/1848* (2013.01); *B60L 11/18* (2013.01); *B60L 11/1803* (2013.01);
(Continued)

(58) Field of Classification Search
CPC ............. B60L 11/1848; B60L 11/1803; B60L 11/1861; G01R 31/3651
(Continued)

(56) References Cited

U.S. PATENT DOCUMENTS 5,202,617 A * 4/1993 Nor ........................... B60L 3/12
320/109
6,483,226 B1 * 11/2002 Okada .................... H02N 2/067
310/317
(Continued)

FOREIGN PATENT DOCUMENTS

JP 2013-38996 A 2/2013
JP 2013-90542 A 5/2013
(Continued)

OTHER PUBLICATIONS

Korean Office Action issued in Korean Application No. 10-2014-0180957 dated Apr. 19, 2016.

*Primary Examiner* — Sun Lin
(74) *Attorney, Agent, or Firm* — McDermott Will & Emery LLP

(57) ABSTRACT

A method and charging system for effectively performing measurement of a pulse width modulation (PWM) signal for selection of a charging mode between an electric vehicle and a charger are disclosed. The method for determining a charging mode of an electric vehicle includes measuring a duty ratio of a control signal applied to a communication line of a charger connector by a first controller for controlling slow charging and a second controller for controlling quick charging, transmitting measurement results obtained from each of the first controller and the second controller to a third controller in charge of a battery, determining a final duty ratio using the measurement results by the third controller, transmitting the determined final duty ratio to the first
(Continued)

controller and the second controller, and starting charging in a mode corresponding to the final duty ratio.

14 Claims, 3 Drawing Sheets

(52) U.S. Cl.
CPC ......... *B60L 11/1861* (2013.01); *H02J 7/0047* (2013.01); *Y02T 10/7005* (2013.01); *Y02T 90/16* (2013.01)

(58) Field of Classification Search
USPC .......................................................... 320/109
See application file for complete search history.

(56) References Cited

U.S. PATENT DOCUMENTS

| | | | |
|---|---|---|---|
| 8,082,072 B2 * | 12/2011 | Egami et al. .......... | B60K 6/445 |
| | | | 180/65.285 |
| 8,618,767 B2 | 12/2013 | Ishii et al. | |
| 8,618,771 B2 * | 12/2013 | Ichikawa .............. | B60L 11/123 |
| | | | 320/109 |

FOREIGN PATENT DOCUMENTS

| | | |
|---|---|---|
| JP | 2013-132188 A | 7/2013 |
| JP | 2014-166084 A | 9/2014 |
| JP | 2014-176232 A | 9/2014 |
| KR | 10-2012-0012650 A | 2/2012 |
| KR | 10-1121228 B1 | 3/2012 |
| KR | 10-2013-0047905 A | 5/2013 |
| KR | 10-2013-0107739 A | 10/2013 |
| KR | 10-1338003 B1 | 12/2013 |

* cited by examiner

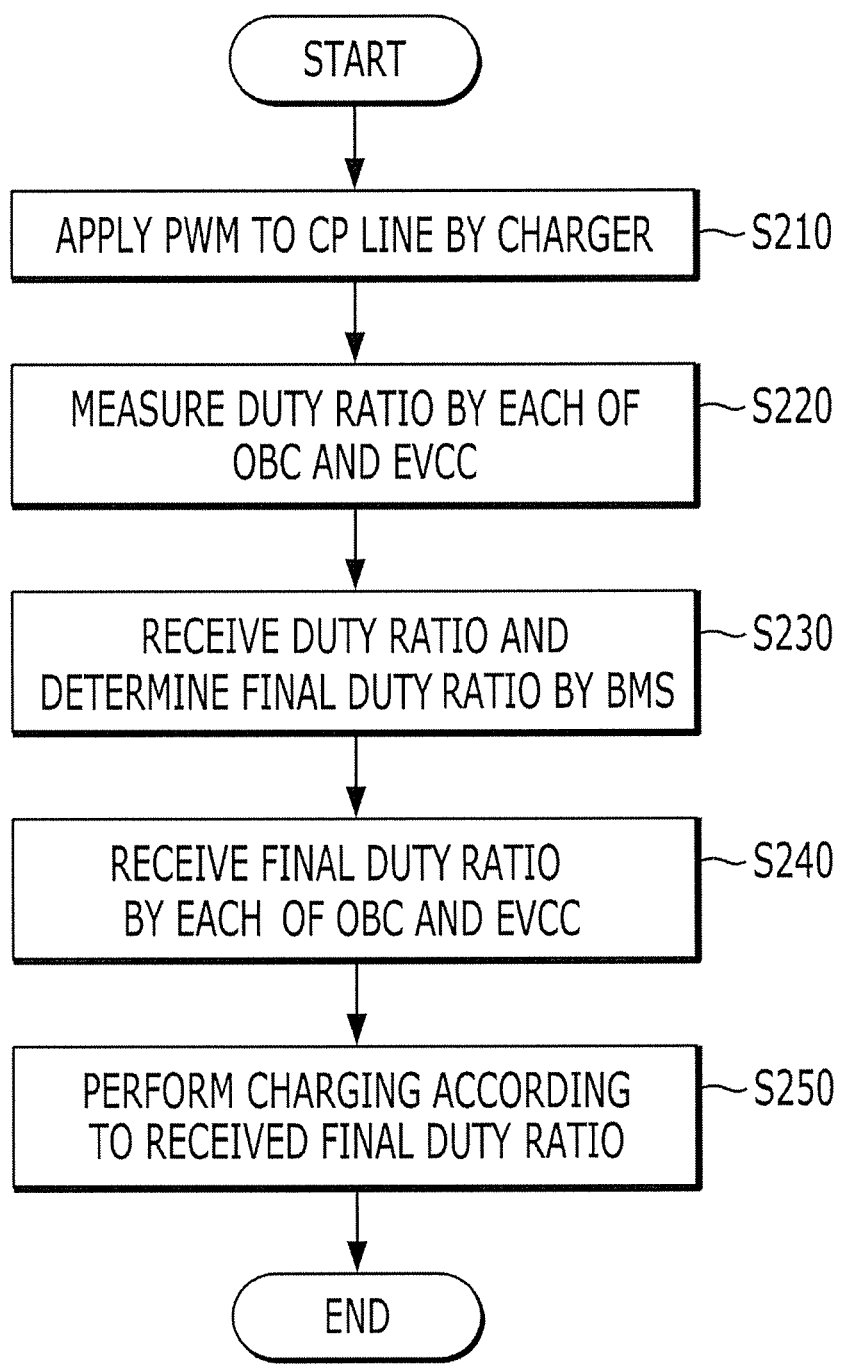

METHOD AND CHARGING SYSTEM FOR SELECTING CHARGING MODE OF ELECTRIC VEHICLE

CROSS-REFERENCE TO RELATED APPLICATION

This application claims the benefit of Korean Patent Application No. 10-2014-0180957, filed on Dec. 16, 2014, which is hereby incorporated by reference as if fully set forth herein.

TECHNICAL FIELD

The present disclosure relates to a method and charging system for effectively performing measurement of a pulse width modulation (PWM) signal for selection of a charging mode between an electric vehicle and a charger.

BACKGROUND

In the past, although electric vehicles were previously developed and deployed compared with diesel and gasoline engine vehicles, electric vehicles never gained traction in car market due to abundant supply of fossil fuels. However, as concern for the environment has gathered strength, the electric vehicle market has expanded due to issues in terms of emission regulations and high oil price. In order to expand the electric vehicle market, charging infrastructures needs to be expanded, but it is not easy to supply the same level of power supply chains due to the characteristics of chargers to be installed at various places.

Accordingly, importance of basic signal processing technologies between an electric vehicle and a charger, defined according to international standards, has also gathered strength. Various standards have been defined as electric vehicle charging methods. Thereamong, a combo method is a representative method.

A DC combo (TYPE 1) method refers to a method in of integrating an alternating current (AC) connector for slow charging and a direct current (DC) connector for quick charging with one power inlet socket and is advantageous in terms of high spatial efficiency because both slow charging and quick charging are achieved via one inlet.

In the DC combo (TYPE 1) method, when one of a slow charging mode and a quick charging mode is selected in a charger, a signal is transmitted to a vehicle from the charger via a pulse width modulation (PWM) method corresponding to the selected mode. For example, in the case of the slow charging mode, a duty ratio (i.e., a ratio between H and L signals of a pulse width) of the PWM signal exceeds 5% and in the case of the quick charging mode, the duty radio of the PWM signal is about 5%.

However, there are problems in measurement of the duty ratio in that a mode cannot be accurately selected due to influence of noise in terms of a vehicle so as to cause charging failure.

SUMMARY OF THE INVENTION

Accordingly, the present invention is directed to a method and charging system for selecting a charging mode of an electric vehicle that substantially obviates one or more problems due to limitations and disadvantages of the related art.

An object of the present invention is to provide a method and apparatus for measuring a duty ratio of a pulse width modulation (PWM) of an electric vehicle to enhance the reliability of recognition for determination of a charging mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for determining a charging mode of an electric vehicle includes measuring a duty ratio of a control signal applied to a communication line of a charger connector by a first controller for controlling slow charging and a second controller for controlling quick charging, transmitting a measurement result obtained from each of the first and second controllers to a third controller in charge of a battery, determining a final duty ratio using the measurement result by the third controller, transmitting the determined final duty ratio to the first controller and the second controller, and starting charging in a mode corresponding to the final duty ratio.

In another aspect of the present invention, a charging system of an electric vehicle includes an inlet connected to a charging connector, a first controller for controlling slow charging and first-measuring a duty ratio of a control signal of a communication line first-branched from the inlet, a second controller for controlling quick charging and second-measuring a duty ratio of a communication line second-branched from the inlet, and a third controller in charge of battery management, for acquiring a measurement result of the first-measuring and a measurement result of the second-measuring, determining a final measurement result using each of the measurement results, and transmitting the final measurement result to the first controller and the second controller, wherein the first controller and the second controller perform controlling to start charging in a mode corresponding to the final duty ratio from a quick charging mode and a slow charging mode.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a flowchart of an example of a charging mode selection process according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts, and a repeated explanation thereof will not be given. The suffixes "module" and "unit" of elements herein are used for convenience of description and thus can be used interchangeably and do not have any distinguishable meanings or functions.

In the description of the present invention, certain detailed explanations of related art are omitted when it is deemed that they may unnecessarily obscure the essence of the invention. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

As described above, in the case of a DC combo (TYPE 1) method, any one of a controller for slow charging and a controller for quick charging is in charge of a charging process via basic signal processing based on a pulse width modulation (PWM) signal and voltage. In this situation, in order to prevent mode selection failure due to noise of the PWM signal, an embodiment of the present invention proposes a method of measuring duty ratios of PWM signals by controllers that are in charge of two different charging methods and transmitting the duty ratios to a battery management system (BMS). Accordingly, the BMS may select any one of charging modes using the two measured values and transmits the selection result to each controller so as to perform charging in a mode according to the selection result.

Here, the controller in charge of the respective charging methods and the BMS may exchange signals via CAN communication, and a PWM signal may be transmitted to a vehicle from a charger via a control pilot line of a charger connector. The control pilot line refers to a communication line for adjusting a charging level between the charger and the vehicle or exchanging other information items.

In addition, slow charging is conducted by an on-board charger (OBC) via signal processing based on a PWM signal and voltage, and quick charging is conducted by a power line communication (PLC) controller (an electric vehicle communication controller or an electric vehicle communication controller (EVCC)) through a PWM signal and PLC.

A configuration of an apparatus for performing the aforementioned method will be described with reference to FIG. 1.

Figure 1A:
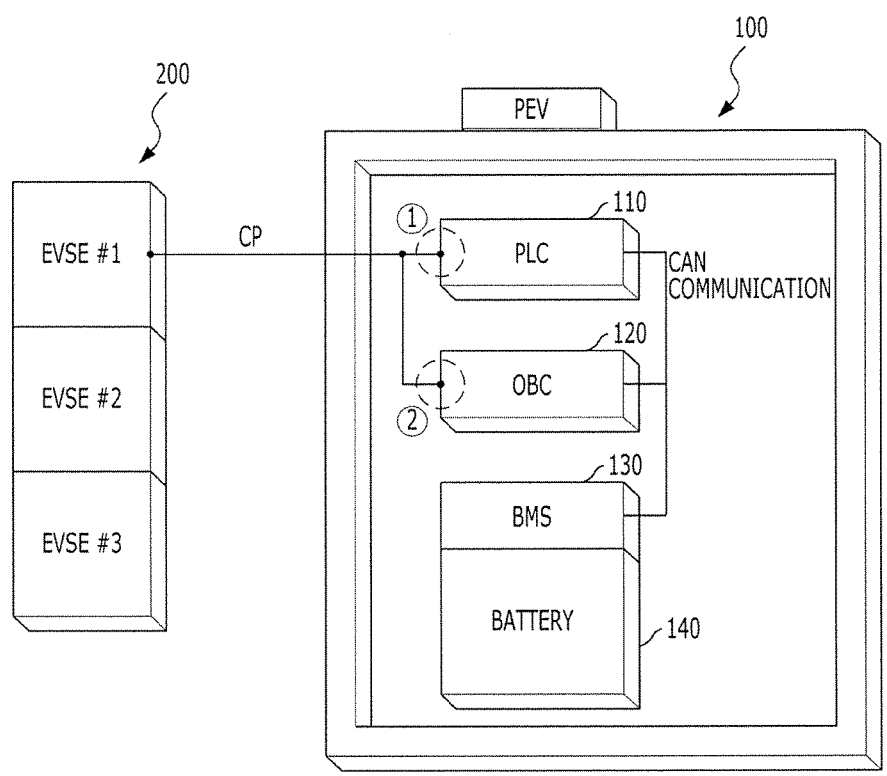
FIGS. 1A and 1B are diagrams illustrating an example of a configuration of a charging system according to an embodiment of the present invention.

FIG. 1A is a block diagram of a configuration of a charging system 100 according to an embodiment of the present invention.

Referring to FIG. 1A, the charging system 100 of a plug-in type electric vehicle (PEV) may include a PLC/EVCC controller 110 for controlling quick charging, an OBC controller 120 for controlling slow charging, a BMS 130, and a battery 140.

The PLC/EVCC controller 110, the OBC controller 120, and the BMS 130 may be connected to each other via CAN communication. The charging system 100 may be connected to an electric vehicle supply equipment (EVSE) 200 through a charging connector and transmits a PWM signal through a control pilot (C/P) line.

Here, the C/P line may be branched from a connector inlet into the EVCC controller 110 and the OBC controller 120 that are connected to each other, the PLC/EVCC controller 110 may measure a duty ratio of a PWM signal at a first point, and the OBC controller 120 may measure a duty ratio of the PWM signal at a second point.

Figure 1B:
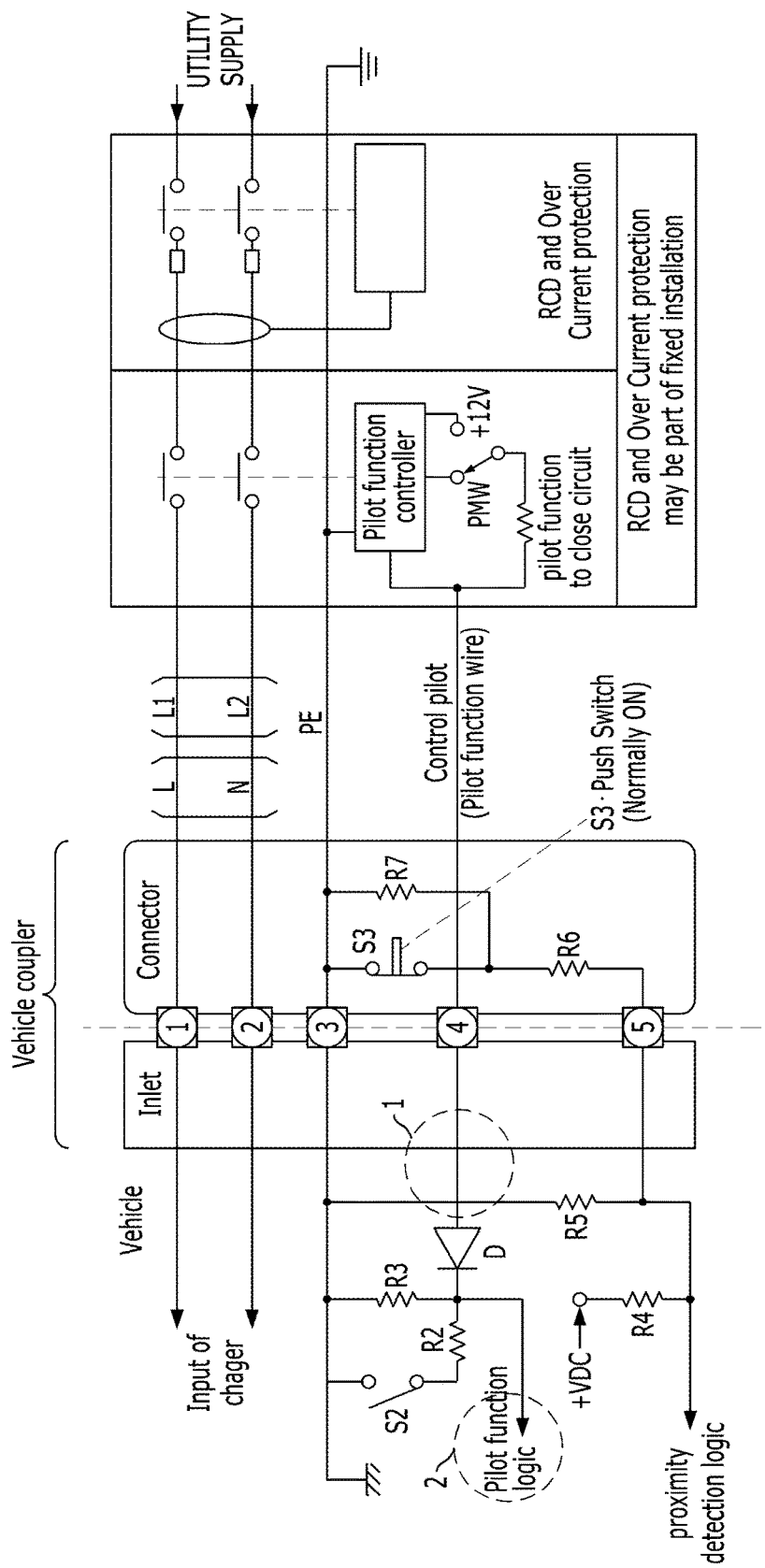

An example of a circuit diagram formed by rearranging the charging system 100 of FIG. 1A is illustrated in FIG. 1B, and points for measurement of a PWM signal may be referred to through the same reference numerals 1 and 2 in FIGS. 1A and 1B.

Hereinafter, a charging mode selection process in the charging system like in FIGS. 1A and 1B will be described with reference to FIG. 2.

FIG. 2 is a flowchart of an example of a charging mode selection process according to an embodiment of the present invention.

When a charger (EVSS) and a vehicle are normally connected, a voltage of a C/P line is lowered to, for example, 9 volts from, for example, 12 volts, and the charger applies a PWM signal to the C/P line in order to start charging (S210).

In this case, in the case of quick charging, the PWM signal is transmitted with a duty ratio of a predetermined duty ratio such as 5%. The OBC and PLC receiving the PWM signal may each measure a duty ratio (S220).

As the measurement result, when the duty ratio is determined to be the predetermined duty ratio, a signal indicating that the PWM duty ratio is the predetermined duty ratio is transmitted to the BMS via CAN communication. The BMS that receives the CAN signal indicating that the PWM duty ratio is the predetermined duty ratio from the OBC and the PLC finally determines that the PWM duty is the predetermined duty ratio according to a preset condition (S230).

An example of a condition for determining a duty ratio by the BMS is shown in Table 1 below.

TABLE 1

|  | OBC | PLC | BMS |
|---|---|---|---|
| Whether PWM ratio is the predetermined duty ratio | Y | N | Y |
|  | N | Y | Y |
|  | Y | Y | Y |
|  | N | N | N |

As shown in Table 1 above, when any one of the OBC and the PLC indicates the predetermined duty ratio, the BMS may determine a final duty ratio as the predetermined duty ratio, and when both the OBC and the PLC indicate a value greater than the predetermined duty ratio, the BMS may determine a final duty ratio that is not the predetermined duty ratio.

The BMS that determines a final duty ratio finally transmits a CAN signal indicating that a PWM duty ratio is the predetermined duty ratio to the OBC and the PLC via CAN communication (S240) and the OBC and PLC that receive the CAN signal may allow charging to proceed according to the determination (that is, in a quick charging mode) (S250).

Through the aforementioned process, a PWM signal is recognized twice in terms of hardware and final determination of the PWM signal is obtained via combination of the recognition results, thereby ensuring robustness with respect to recognition of the PWM signal.

Needless to say, the determination standard of Table 1 is purely exemplary, and thus (1) only a measurement result of the second point (i.e., the OBC controller) may be applied without using monitoring in the first point (i.e., the PLC/EVSS controller) in FIGS. 1A and 1B, (2) the two measurement results may be applied, and when any one of the measurement results is updated, the updated result may be applied, or (3) the corresponding result may be applied only when the two measurement results correspond to each other.

The above invention can also be embodied as computer readable code stored on a computer readable recording medium. The computer readable recording medium is any data storage device that can store data which can thereafter be read by a computer system. Examples of the computer readable recording medium include a hard disk drive (HDD), a solid state disk (SSD), silicon disk drive (SDD) read-only memory (ROM), random-access memory (RAM), CD-ROMs, magnetic tapes, floppy disks, optical data storage devices, etc., and also include carrier wave (e.g., transmission via the Internet).

According to at least one embodiment of the present invention, the following advantages can be obtained.

Controllers in charge of respective charging modes may measure duty ratios together and transmit the measurement results to a BMS, and thus the BMS can select a mode with high reliability.

Even if a problem arises in any one of controllers for measuring duty ratios, the duty ratios can be compensated for and noise can be more sensitively measured by simply changing settings.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for determining a charging mode of an electric vehicle, the method comprising:
    measuring a duty ratio of a control signal applied to a communication line of a charger connector by a first controller for controlling slow charging and a second controller for controlling quick charging;
    transmitting measurement results obtained from each of the first controller and the second controller to a third controller for managing a battery;
    determining a final duty ratio using the measurement results by the third controller;
    transmitting the determined final duty ratio to the first controller and the second controller; and
    starting charging in a mode corresponding to the determined final duty ratio.

2. The method according to claim 1, wherein the control signal is a pulse width modulation (PWM) signal.

3. The method according to claim 1, wherein:
    the first controller comprises an on-board charger (OBC) controller, and
    the second controller comprises an electric vehicle communication controller (EVCC).

4. The method according to claim 1, wherein the third controller comprises a battery management system (BMS).

5. The method according to claim 1, wherein the first controller, the second controller, and the third controller are connected via controller area network (CAN) communication.

6. The method according to claim 1, wherein the third controller determines the final duty ratio to be a predetermined duty ratio when any one of the measurement results is equal to the predetermined duty ratio.

7. The method according to claim 1, wherein the starting comprises:
    starting charging in a quick charging mode when the final duty ratio is equal to a predetermined duty ratio, and
    starting the charging in a slow charging mode when the final duty ratio exceeds the predetermined duty ratio.

8. A charging system of an electric vehicle, the charging system comprising:
    an inlet connected to a charging connector;
    a first controller for controlling slow charging and first-measuring a duty ratio of a control signal of a communication line first-branched from the inlet;
    a second controller for controlling quick charging and second-measuring a duty ratio of a communication line second-branched from the inlet; and
    a third controller in charge of battery management, for acquiring a first measurement result of the first-measuring and a second measurement result of the second-measuring, determining a final measurement result using each of the first measurement result and the second measurement result, and transmitting the final measurement result to the first controller and the second controller,
    wherein the first controller and the second controller perform controlling to start charging in a mode corresponding to a final duty ratio from a quick charging mode and a slow charging mode.

9. The charging system according to claim 8, wherein the control signal is a pulse width modulation (PWM) signal.

10. The charging system according to claim 8, wherein:
    the first controller comprises an on-board charger (OBC) controller, and
    the second controller comprises an electric vehicle communication controller (EVCC).

11. The charging system according to claim 8, wherein the third controller comprises a battery management system (BMS).

12. The charging system according to claim 8, wherein the first controller, the second controller, and the third controller are connected via controller area network (CAN) communication.

13. The charging system according to claim 8, wherein the third controller determines the final duty ratio to be a predetermined duty ratio when any one of measurement results is equal to the predetermined duty ratio.

14. The charging system according to claim 8, wherein:
    the charging is started in a quick charging mode when the final duty ratio is a predetermined duty ratio, and
    the charging is started in a slow charging mode when the final duty ratio exceeds the predetermined duty ratio.

* * * * *